US007944494B2

(12) United States Patent
Oda et al.

(10) Patent No.: US 7,944,494 B2
(45) **Date of Patent: *May 17, 2011**

(54) SOLID-STATE IMAGE PICKUP APPARATUS DRIVEN AT A FREQUENCY ADAPTIVE TO PHOTOGRAPHIC SENSITIVITY

(75) Inventors: Kazuya Oda, Asaka (JP); Takeshi Miyashita, Asaka (JP)

(73) Assignee: Fujifilm Corporation, Tokyo (JP)

( * ) Notice: Subject to any disclaimer, the term of this patent is extended or adjusted under 35 U.S.C. 154(b) by 225 days.

This patent is subject to a terminal disclaimer.

(21) Appl. No.: 12/005,373

(22) Filed: Dec. 27, 2007

(65) Prior Publication Data

US 2008/0111908 A1 May 15, 2008

Related U.S. Application Data

(62) Division of application No. 10/802,722, filed on Mar. 18, 2004, now Pat. No. 7,372,494.

(30) Foreign Application Priority Data

Mar. 28, 2003 (JP) ................................ 2003-091393

(51) Int. Cl.

*H04N 3/14* (2006.01)
*H04N 5/335* (2006.01)
*H04N 5/235* (2006.01)

(52) U.S. Cl. .................................... 348/311; 348/229.1

(58) Field of Classification Search .................. 348/311, 348/229.1

See application file for complete search history.

(56) References Cited

U.S. PATENT DOCUMENTS

| | | | | |
|---|---|---|---|---|
| 4,833,536 | A | 5/1989 | Okino et al. | |
| 4,870,493 | A * | 9/1989 | Izawa et al. | 348/305 |
| 5,376,964 | A | 12/1994 | Soga et al. | |
| 7,268,810 | B2 * | 9/2007 | Yoshida | 348/240.2 |
| 2002/0105581 | A1 | 8/2002 | Masaki et al. | |

FOREIGN PATENT DOCUMENTS

| | | | |
|---|---|---|---|
| EP | 0 615 376 | A2 | 7/1994 |
| JP | 2000-032332 | A | 1/2000 |

* cited by examiner

*Primary Examiner* — James M Hannett

(74) *Attorney, Agent, or Firm* — Birch, Stewart, Kolasch & Birch, LLP

(57) ABSTRACT

A digital camera feeds information input on an operation panel to a system controller. The system controller generates a control signal in accordance with optical sensitivity selected and feeds it to a timing signal generator. The timing signal generator includes a signal generator, which generates a timing signal whose frequency matches with the control signal. While a solid-image image sensor is driven by the timing signal, the frequency of a horizontal transfer signal is made lower than the usual frequency in accordance with the sensitivity selected. This prevents the number of electrons from noticeably decreasing during horizontal transfer to thereby enhance transfer efficiency for a single stage of transfer.

1 Claim, 3 Drawing Sheets

MONITOR
STORAGE
ESTIMATED VALUE CALC.
SIGNAL PROCESSOR
SCENE DECIDER
SYSTEM CONTROLLER
OPERATION PANEL
PREPROCESSOR
SG
TIMING SIGNAL GENERATOR
IMAGE PICKUP
OPTICS
DRIVER
10
12
14
16
18
20
22
24
26
28
30
32
34
36
38
40
42
44
46
48
50
52
54
56
58
60
62
66
68
70
72
74

SOLID-STATE IMAGE PICKUP APPARATUS DRIVEN AT A FREQUENCY ADAPTIVE TO PHOTOGRAPHIC SENSITIVITY

This is a Divisional of application Ser. No. 10/802,722 filed on Mar. 18, 2004, now U.S. Pat. No. 7,372,494, which claims priority under 35 U.S.C. §119(a) on Patent Application No(s). 2003-091393 filed in Japan on Mar. 28, 2003, the entire contents of which are hereby incorporated by reference.

BACKGROUND OF THE INVENTION

1. Field of the Invention

The present invention relates to a solid-state image pickup apparatus and more particularly to, e.g. a digital camera having enhanced pixel density, such as a mega-pixel camera, and capable of shooting a subject with a selectable photographic sensitivity.

2. Description of the Background Art

It is a common practice with a digital camera to allow the user of the camera to select desired one of a plurality of photographic sensitivities. Sensitivity or photographic sensitivity refers to ISO (International Organization for Standardization) sensitivity conventionally for use in the sensitivity of photographic film. More specifically, a digital camera is often configured to allow the user of the camera to select either one of a low-sensitivity mode and a high-sensitivity mode corresponding to the ISO sensitivity ranging from 100 to 400 and the ISO sensitivity of 800 and over, respectively.

When such a digital camera is used to shoot a desired subject, an exposure time is reflected by the amount of signal charges generated. More specifically, the amount of signal charges generated in pixels, or photosensitive cells of the camera, increases in the low-sensitivity mode due to a longer exposure time, or decreases in the high-sensitivity mode due to a shorter exposure time.

The signal charges thus stored in the photosensitive cells are read out onto vertical transfer paths implemented as (charge-coupled devices (CCDs) and then transferred to a horizontal transfer path along the vertical transfer paths. The signal charges, i.e. electrons stored in the photosensitive cells are lost as the time elapses due to, e.g. thermal diffusion, as known in the art. The amount of signal charges exponentially decreases with the elapse of time. As a result, even when the same amount of signal charges is generated between the photosensitive cells close to the horizontal transfer path and those far from the same, the amount of signal charges actually be transferred to the horizontal transfer path differs from each other, thus degrading the quality of a resulting image.

Further, while the signal charges stored are sequentially transferred via potential wells formed in the individual transfer CCDs, a certain amount of electrons or signal charge remains in each CCD although it is extremely small. Consequently, the residual signal charges in the transfer CCDs will be mixed with signal charges which will follow, when transferred to the same transfer CCDs, in the next signal transfer and be different in color from the residual signal charges. This mixture of different colors (referred to as color mixture hereinafter) is another cause of the deterioration of image quality.

The deterioration of signal charges which is brought about due to the above causes when the charges are transferred by one stage of transfer is generally referred to as transfer efficiency. Color mixture is therefore apt to easily occur when the signal charges are transferred via a number of transfer stages. The transfer efficiency is an issue relating not only to the vertical transfer paths but also to the horizontal transfer path of an imaging device.

A modern solid-state image pickup apparatus is required to have horizontal transfer efficiency high enough to match with the several million to ten and several million pixels and the increasing photographic sensitivity of the apparatus. To meet this requirement, there has been a proposal to increase a drive frequency assigned to the horizontal transfer path for thereby guaranteeing the frame rate regulated.

However, a solid-state image pickup apparatus, originally low in yield, has a problem that transfer efficiency on the horizontal transfer path is lowered by the same causes as stated in relation to the vertical transfer paths. Particularly, the latter cause stated above allows a certain amount of signal charges to be left in the individual CCDs generally without regard to the quantity of incident light. As a result, when an image is generated by a small amount of signal charges as in the high-sensitivity mode, the influence of color mixture becomes critical because of the intrinsically small amount of signal charges. The influence of color mixture becomes more critical as the number of transfer stages increases. More specifically, color shift or offset is conspicuous in a picture having a gray or white area.

SUMMARY OF THE INVENTION

It is an object of the present invention to provide a solid-state image pickup apparatus capable of obviating the influence of color mixture ascribable to the degradation of transfer efficiency for thereby generating a high-quality image.

A solid-state image pickup apparatus of the present invention converts light incident thereto from an object field to an electric picked-up signal and processes the picked-up signal to thereby produce an image signal. The image pickup apparatus includes a solid-state image sensor in which an array of photosensitive cells is bidimensionally arranged. Each photosensitive cell converts the light to a particular signal charge in accordance with one of a plurality of optical sensitivities which is selected. The signal charges generated by the photosensitive cells are read out to vertical transfer paths and vertically transferred therealong and then transferred in a horizontal direction in response to a horizontal transfer signal along a horizontal transfer path, which extends perpendicularly to the vertical transfer paths, to be thereby output as the picked-up signal. A selecting circuit selects one of the plurality of sensitivities. A system controller generates a control signal in accordance with the sensitivity selected. A timing generator generates a timing signal for transferring the signal charges for the image sensor in response to the control signal. The timing generator lowers, in accordance with the sensitivity selected, the frequency of the horizontal transfer signal below a usual frequency for use in transferring the signal charges in the horizontal direction.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

Figure 1:
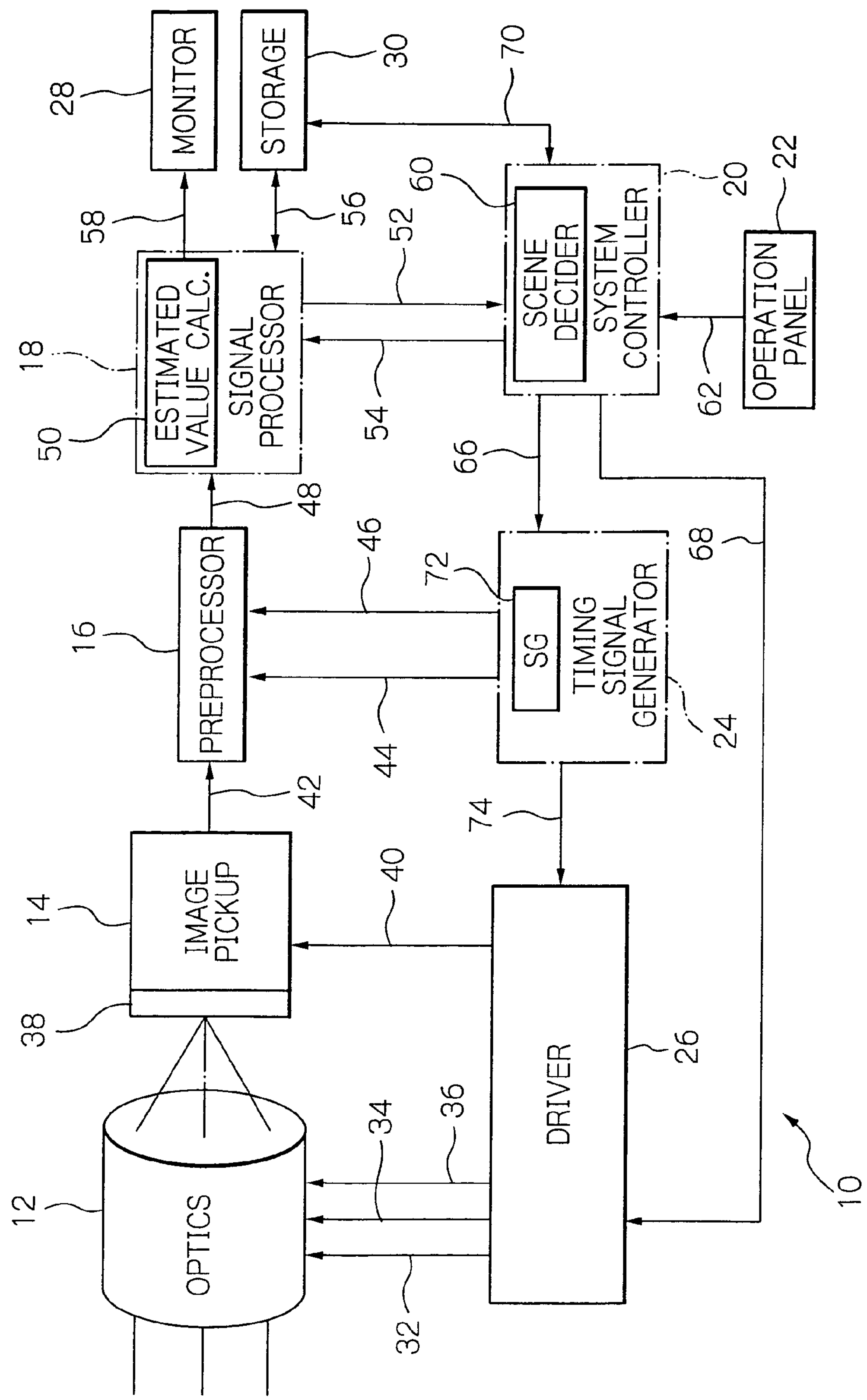
FIG. 1 is a schematic block diagram showing a solid-state image pickup apparatus embodying the present invention.

Referring to FIG. 1 of the drawings, a solid-state image pickup apparatus embodying the present invention is implemented as a digital camera by way of example. It is to be noted that part of the image forming apparatus not directly relevant to the understanding of the present invention is not shown or will not be described. Signals are designated by reference numerals attached to connections on which they appear.

As shown in FIG. 1, the digital camera, generally 10, includes optics 12, an image pickup section 14, a preprocessor 16, a system controller 20, an operation panel 22, a timing signal generator 24, a driver 26, a display monitor 28 and a storage 30 interconnected as illustrated.

The optics 12 includes a mechanical shutter, a set of optical lenses, a zoom mechanism, an iris control mechanism, and an automatic focus (AF) control mechanism, although not shown specifically. Those mechanisms are configured to focus a light beam incident to the optics 12 onto the photosensitive array, not shown, of the image pickup section 14 via the optical lenses.

More specifically, the zoom mechanism controls the viewing angle of an object field to be shot while the AF control mechanism automatically shifts the optical lenses in order to focus a subject to form the image thereof onto the photosensitive array of the image pickup section 14. These mechanisms include respective motors for so shifting the optical lenses in response to a drive signal 32 fed from the driver 26.

The iris control, or automatic exposure (AE) control, mechanism causes a ring thereof, not shown, to rotate in response to a drive signal 34 also fed from the driver 26. The ring has blades overlapping each other to form a circular iris or optical opening, so that an incident light beam is passed through the iris. In this manner, the iris control mechanism varies the radius of the iris. If desired, in the iris control mechanism, a mechanical shutter may be implemented in the form of lens shutter associated with the optical lenses.

The mechanical shutter screens the image pick-up section 14 from an incident light beam except for the time of pickup and defines an exposure time between the start and the end of exposure. The mechanical shutter may be implemented in the form of focal-plane shutter customarily applied to a single-lens reflex camera. The focal-plane shutter includes a blind formed with a slit and caused to rapidly run either vertically or horizontally, so that exposure is effected by the width of the slit. Of course, the lens shutter may be substituted for the focal-plane shutter, as mentioned above. The mechanical shutter is operated by a drive signal 36 output from the driver 26.

The image pickup section 14 includes an optical low-pass filter, not shown, and a solid-state image sensor 38 to which a color filter, not shown, is attached. The optical low-pass filter limits the spatial frequencies of incident light to the Nyquist frequency and below. The solid-stated image sensor 38 includes charge-coupled devices (CCDs) arranged for generating signal charges and transfer gates (TGs) for reading out the signal charges to vertical transfer paths, although not shown specifically. A drive signal 40, which is fed from the driver 26 to the image sensor 38, includes a horizontal and a vertical drive signal and an overflow drain (OFD) signal matching with the operation mode of the image sensor 38. The image pickup section 14 is adapted to deliver an analog voltage signal 42 thus produced by the image sensor 38 to the preprocessor 16 as a picked-up signal.

In the illustrative embodiment, the image sensor 38 is the type of being selective in its optical sensitivity. More specifically, the digital camera 10 is adapted to allow the user of the camera 10 to select a plurality of different sensitivities, i.e. a low-sensitivity mode or a high-sensitivity mode corresponding to the ISO sensitivity ranging from 100 to 400 and the ISO sensitivity of 800 and over, respectively. The drive of the image sensor 38 will later be described more specifically.

The preprocessor 16 is adapted for canceling noise and includes a correlated double sampling (CDS) circuit, a gain-controlled amplifier (GCA) and an analog-to-digital (A/D) converter, although not shown specifically. The timing signal generator 24 feeds the CDS circuit with CDS pulses 44 as a sampling signal and the A/D converter with a conversion clock signal 46. The preprocessor 16 performs noise cancellation, waveform shaping and digitization on the analog signal 42 input from the image pickup section 14 and delivers the resulting all image data to the signal processor 18 in the form of digital image data.

The signal processor 18 includes an estimated value calculator 50, which includes an automatic white balance (AWB) control circuit not shown, and additionally includes a gamma corrector, a synchronization processor, an image corrector, a compander, a storage card interface, an image reducer and an image memory which are also not shown. The estimated value calculator 50 includes a calculating circuit for using gamma-corrected image data obtained by, e.g. preliminary photometry to calculate an iris value and a shutter speed, as well as a white balance control value and a tone or gradation correction value. The calculating circuit uses the input image data to produce the adequate cumulative values 52 for the parameters and feeds the resultant values 52 to the system controller 20 as the parameters. Particularly, from the digital data 48 generated from the preliminary photometry, the automatic white balance control circuit determines a white balance gain for a preselected block or blocks that constitute a picture area.

If desired, the estimated value calculator 50 stated above may be included in the system controller 20, in which case the signal processor 18 should only feed the gamma-corrected image data to the system controller 20.

Generally, the digital data or image signal 48 is input to the image memory over a data bus. The signal processor 18 is controlled by a control signal 54 fed from the system controller 20 over a control bus. Timing signals, not shown, are delivered from the timing signal generator 24 to the signal processor 18 and include a horizontal sync signal HD, a vertical sync signal VD and an operation clock, which will be described later, meant for the various circuits of the signal processor 18.

The circuits of the signal processor 18 will be described more specifically hereinafter. The gamma corrector is adapted to store, e.g. a lookup table for gamma correction and references the lookup table to perform gamma correction on the image data fed from the image memory. The resultant gamma-corrected image data are written to the image memory.

In the illustrative embodiment, the color filter of the image pickup section 14 is implemented as a single plate of color filter of primary colors. Therefore, photosensitive cells, which are of course actually arranged as real pixels, do not produce pixel data of colors other than the color of the color filter segment provided over the real pixels. In light of this, the synchronization processor includes a calculating circuit for calculating pixel data of primary colors unavailable with the color filter segment of the real pixels by interpolation that uses pixel data of the pixels around the real pixel of the existing primary color. This is successful to complete the three primary colors on the same time point for the pixels to be dealt with and is, in this sense, referred to as synchronization.

Further, in an application in which the image pickup section 14 is of the type having photosensitive cells arranged in a so-called honeycomb pattern, virtual pixels are assumed where the photosensitive cells are absent. In this case, the synchronization processor may be adapted for using pixel data of the actual pixels and calculated or interpolated pixels surrounding the virtual pixels to generate new pixel data for the virtual pixels as well. Moreover, the synchronization processor may perform interpolation by use of pixel data of green (G) or luminance data (Y) to thereby broaden the frequency band of pixel data generated. The image data thus synchronized are stored into the image memory.

The image corrector is adapted to multiply the image data of the three primary colors thus synchronized by a predetermined coefficient to thereby execute color difference matrix processing. Besides, the corrector performs edge sharpening on the luminance data generated and performs color enhancement on the color data Cb and Cr generated. The resulting image data, consisting of the luminance data Y and color or color difference data Cb and Cr, are fed from the corrector to the image memory. It is to be noted that the corrector and compander are not operative when raw data should be recorded, which are not subjected to synchronization.

The compander is adapted to compress image data (Y/C) and color difference data fed thereto in a camera or still picture mode or a movie mode by use of, e.g. the JPEG (Joint Photographic coding Experts Group) standard or the MPEG (Moving Picture coding Experts Group)-1 or -2 standard. The image data thus compressed are fed to the storage card interface. The card interface interfaces the camera 10 with a memory card or recording medium, which is, although not shown, detachably mounted as the storage 30, as to the electric characteristics and timing in the event of writing or reading. Image data 56 output from the card interface are delivered to the storage 30. The compander is also capable of reading out the image data 56 stored in the storage 30 via the card interface and then performing the processing opposite to the compression to expand the image data 56.

The image reducer serves as executing R (red), G and B (blue) conversion on the image data (Y/C and color difference data) which are generated or expanded during reading out. The image reducer then reduces the size or amount of the image data thus converted to a plurality of pixels that allow the picture represented by the reduced pixels to be displayed on the display monitor 28 freely from defects by interpolation. Image data 58 reduced in size are fed to the monitor 28 to be visualized as an image on the monitor 28.

The digital image data 48 are written into the image memory and temporarily stored therein. Also, in the processing stated earlier, the image data thus temporarily stored in the image memory are read out, processed, and again stored into the image memory. The image memory should preferably be implemented by a nonvolatile memory when repeated reading is necessary.

The signal processor 18 further includes a signal generator, not shown, operating in response to a control signal. The signal generator includes a phase-locked loop (PLL) capable of generating a plurality of different frequencies. More specifically, the signal generator multiplies the oscillation frequency generated by its local oscillator, i.e. a reference clock, to thereby generate a plurality of different clock signals, although not shown specifically, and feeds the clock signals to the system controller 20 and timing signal generator 24.

The system controller 20 comprises a microcomputer or a CPU (Central Processing Unit) for controlling the subsections of the camera 10 including the digital processing subsections. The system controller 20 includes a scene decider 60, an EEPROM (Electrically Erasable Programmable Read-Only Memory) for storing coefficients, and a ROM storing program sequences controlling operation procedures for the camera 10. The scene decider 60 is, implemented with software processing, adapted to compare the cumulative values 52 input from the signal processor 18 with a predetermined threshold and then controls the timing signal generator 24 and driver 26 in accordance with the result from the comparison.

Further, the system controller 20 is adapted to receive a command signal 62 generated by the operation panel 22 and defining the operational modes and a operation trigger and condition the digital camera 10 for, e.g. the camera or movie mode and the low- or high-sensitivity mode in response thereto. Subsequently, the system controller 20 is responsive to a shutter release button, not shown, defining an image pickup timing to generate controls signals 54, 66 and 68 matching with the cumulative values 52. The control signals 54, 66 and 68 are in turn delivered to the signal processor 18, timing signal generator 24 and driver 26, respectively.

More specifically, the system controller 20 generates the control signal 54 with the line interpolation effected in the signal processor 18 and the control over the signal generator and signal processing taken into account, and controls writing/reading operation of the storage 30 with a control signal 70. In addition, the system controller 20 controls the operation timing of the preprocessor 16.

The operation panel 22 includes a mode selector and the shutter release button, although not shown specifically. The mode selector allows the user to select, e.g. the camera or movie mode and the low- or high-sensitivity mode based on the ISO sensitivity, among the modes involved in the camera 10. The illustrative embodiment is capable of dealing with the ISO sensitivity ranging between 100 and 1,600 by way of example. The mode selector outputs the command signal 62 representative of the modes selected by the user.

The shutter release button has a first and a second stepwise stroke S1 and S2 that condition the digital camera 10 for preliminary and actual pickups, respectively. The command signal 62 fed to the system controller 20 is representative of a trigger timing defined by the first stroke S1 or the second stroke S2. The operation panel 22 may additionally include a zoom switch and direction buttons and may be provided with a function of selecting conditions to be displayed on a liquid crystal display (LCD) panel.

The timing signal generator 24 includes an signal generator (SG) or oscillator 72 for generating the operation frequency of the timing signal. The signal generator 72 is capable of varying its oscillation frequency in response to the control signal 66. Particularly, the signal generator 72 selectively oscillates a first frequency usually used for the generation of a horizontal transfer signal or a second frequency which is about one half of the first frequency. More specifically, the timing signal generator 24 feeds the driver 26 with a horizontal transfer signal having the first frequency in the low-sensitivity mode or the second frequency in the high-sensitivity mode. The second frequency may be an integral multiple of the first frequency, e.g. the former and latter may be 6 MHz and 3 MHz, respectively.

Further, the timing signal generator 24 generates various timing signals on the basis of a reference clock signal not shown. The timing signals include vertical and horizontal sync signals, field shift pulses, a vertical transfer signal and electronic shutter pulses in addition to the horizontal transfer signal. Besides, the timing signal generator 24 feeds the CDS pulses 44 and conversion clock signal 46 to the preprocessor 16, as stated earlier. The above timing signals, collectively labeled 74, are input to the driver 26.

European patent publication No. 0 615 376 A2 discloses an image reading apparatus configured to vary the frequency of a drive pulse signal fed to a solid-state image sensor between a read-out and a stand-by interval, thereby reducing heat to be generated in and around the image sensor during stand-by interval (referred to as a comparative example hereinafter). The comparative example includes two oscillators respectively outputting oscillation clocks meant for the read-out and stand-by intervals. The two oscillation clocks both are input to a switching circuit. The switching circuit selects one of the input oscillation clocks in response to a control signal fed from a read-out controller and feeds the oscillation thus selected to a CCD drive pulse generator.

The comparative example stated above may be similar to the illustrative embodiment only as to the configuration of the timing signal generator 24 and the selective use of a plurality of frequencies. However, it is important to note that the timing signal generator 24 of the illustrative embodiment addresses to color shifts or offsets ascribable to the read-out of signal charges and is therefore definitely different from the comparative example that addresses to unstable image quality ascribable to the heat generation. The comparative example would not improve the color mixture even when applied to the illustrative embodiment.

Now returning to the illustrative embodiment, the driver 26 includes a drive circuit configured to generate the drive signals 32 through 36 and 40 in response to the timing signals 74 and control signal 68 input thereto. More specifically, the driver 26 feeds the drive signals 32 through 36 to the lens and iris control mechanism of the optics 12 in order to cause them to perform the AF and AE control, respectively. The driver 26 delivers the drive signal 36 to the mechanical shutter such that the mechanical shutter opens and then closes in accordance with the timing of the actual shot, which is defined by the shutter release button of the operation panel 22 depressed.

Moreover, by delivering the drive signals 40 derived from the timing signals 74 to the image sensor 38, the driver 26 causes the photosensitive cells of the image sensor 38 to generate signal charges, reads out the signal charges to the vertical transfer paths or registers under the control matching with the previously stated conditions, transfers the signal charges to the horizontal transfer path or registers via the vertical transfer paths, and then outputs the signal charges via the horizontal transfer path and an output amplifier, not shown, in the form of analog voltage signal 42 mentioned earlier.

In the illustrative embodiment, the driver 26 varies, among the drive signals 40, a horizontal drive voltage in response to the control signal 68. The driver 26 is adapted to produce two different voltages and selectively feed either of the voltages via a selector switch to its drive circuit which outputs the horizontal drive signal. More specifically, the switch selects, in response to the control signal 68, either one of the high and voltages applied to its two inputs. In the illustrative embodiment, the two different voltages lie in the range of from 3 to 5 volts. More specifically, a high voltage of 5 volts is input to the drive circuit in the high sensitivity mode while a low voltage of 3 volts is applied to the same in the low sensitivity mode. This configuration is effective when the timing signal generator 24 is not adaptive to ISO sensitivity. Stated another way, the generation of the horizontal drive signal adaptive to ISO sensitivity should only be assigned to either one of the timing signal generator 24 and driver 26.

Image data output from a display controller are input to a display device included in the monitor 28 and displayed on the monitor 28. More specifically, the monitor 28 is generally implemented by a liquid crystal display monitor including its display controller. The display controller, not shown, is responsive to the image data 58 to control the orientation of liquid crystalline molecules by means of a voltage applied thereto, thus causing the monitor 28 to display an image represented by the image data 58. The monitor 28 may, of course, be implemented by a type of display device other than the liquid crystal display monitor so long as it has a small size, allows an image to be visualized and saves power.

The storage 30 may be implemented in the form of semiconductor memory, optical disk or a magneto-optical disk or similar recording or storage medium to record the image data 56 fed from the signal processor 18. The storage 30 functions as writing in and/or reading out, under the control of the system controller 20, data with a recording and/or a sensing head, i.e. transducer, comprising a pickup or a combination of a pickup and a recording head matching with the type of recording medium, although not shown specifically.

With the configuration described above, the illustrative embodiment switches the frequency of the horizontal transfer signal in accordance with the ISO sensitivity or the sensitivity mode to thereby enhance transfer efficiency for a single stage of transferring signal charges. This reduces the influence of degradation of image quality.

Figure 2:
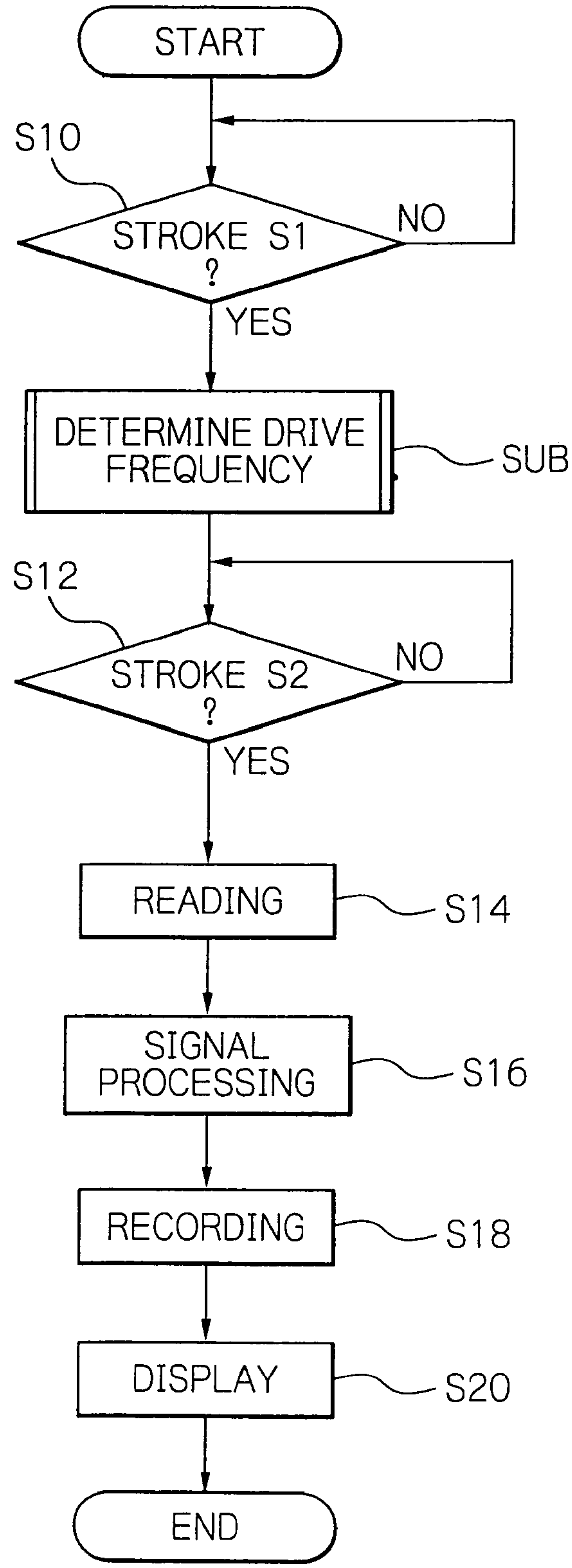
FIG. 2 is a flowchart useful for understanding a specific operation of the embodiment shown in FIG. 1.
Figure 3:
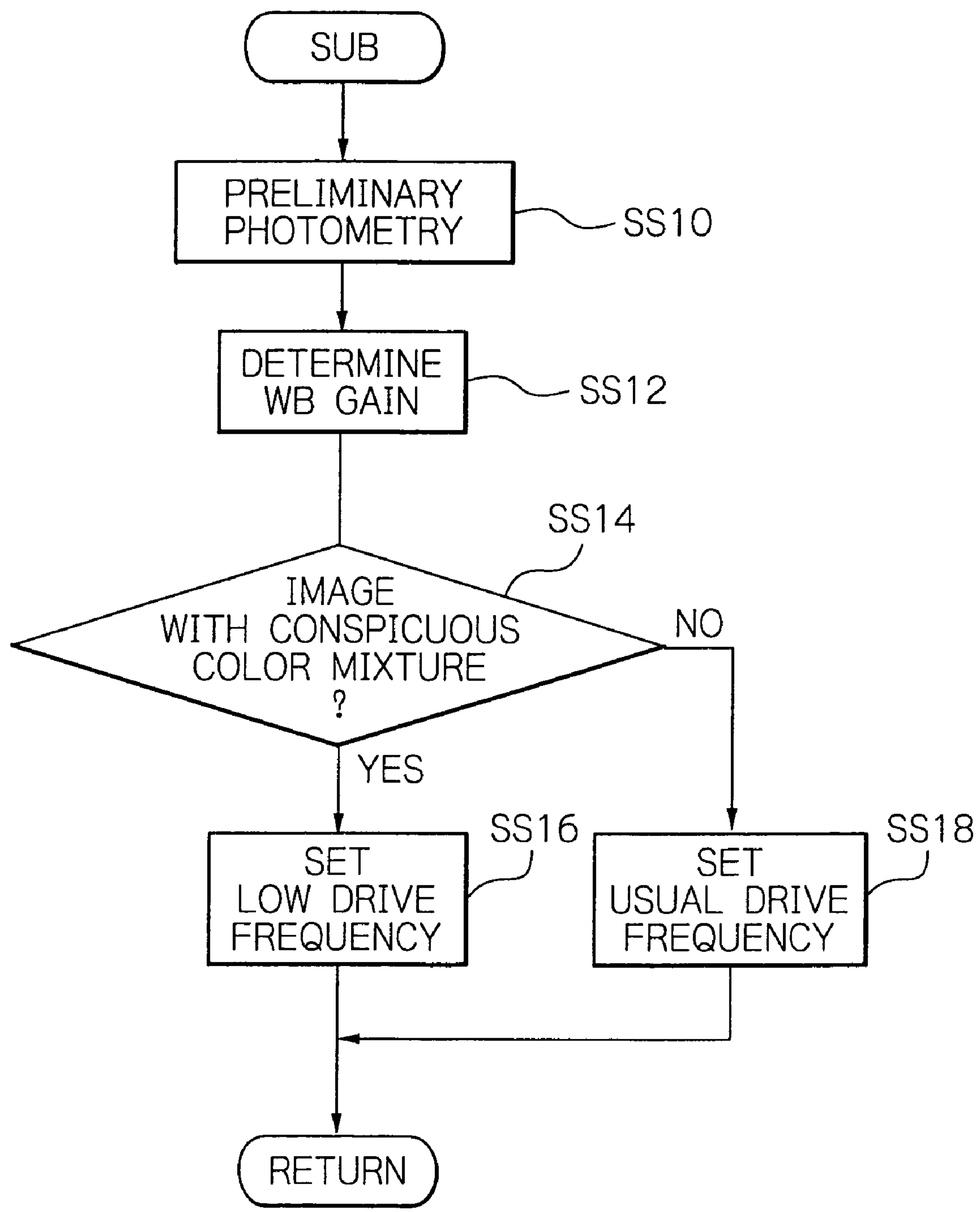
FIG. 3 is a flowchart showing a specific subroutine included in the flow shown in FIG. 2.

Reference will be made to FIGS. 2 and 3 for describing a specific operation of the digital camera 10. Before starting the procedure, the camera 10 has been initialized automatically upon the power-up thereof. Although not shown specifically, the user of the camera 10 selects a desired ISO sensitivity on the operation panel 22 by hand. In response, the camera 10 sets either one of the low and high sensitivity modes on the basis of the ISO sensitivity selected.

In the above condition, the camera 10 determines whether or not preliminary photometry has been executed, i.e. whether or not the user has pressed the shutter release button of the operation panel 22 by its first stroke S1 (step S10). If the answer of the step S10 is negative, NO, the camera 10 then waits for preliminary photometry. If the answer of the step S10 is positive, YES, the camera 10 then executes a subroutine SUB for selecting a drive frequency.

In the subroutine SUB, FIG. 3, the low or high drive frequency may simply be selected in the high or low sensitivity mode, respectively. It is more preferable to select a drive frequency in matching relation to the individual image than to simply select it on the sensitivity mode basis, as will be described more specifically later.

After the subroutine SUB, the camera 10 determines whether or not an actual pickup command is input, i.e. whether or not the user has pressed the shutter release button by its second stroke S2 deeper than the first stroke S1 (step S12). If the answer of the step S12 is NO, the camera 10 waits for the second stroke S2. If the answer of the step S12 is YES, although not shown specifically, the system controller 20 controls the image sensor 38 in accordance with the parameters derived from the preliminary photometry and then starts exposure. The end of the exposure is defined by the time when, e.g. the mechanical shutter closes.

After the exposure finished, signal charges generated during the exposure are read out (step S14). At this instant, the horizontal drive signal, fed to the horizontal transfer registers of the image sensor 38, has the drive frequency selected in the subroutine SUB stated earlier. Even if the image sensor 38 is horizontally driven by the low or high sensitivity mode, the amount of charges, i.e. the number of electrons, decreases little and insures high image quality although the reading time is relatively longer.

Further, if the amount of signal charge is smaller, the influence of an extremely small amount of residual charges occurring during the horizontal transfer is relatively greater. To cope with the color mixture resultant from the residual charges in the embodiment, the horizontal registers are assigned particularly to the respective colors of the color filter segments provided in the image sensor 38. For example, in the case of three primary colors R, G and B, it is preferable to provide the image sensor 38 with three horizontal transfer registers and shift gates intervening between the horizontal transfer registers so as to transfer signal charges of the same color over the transfer register assigned thereto. This reduces the probability of the color mixture far more than the conventional signal charge reading system that aggravates color mixture by the several stages of transferring signal charges. Potential wells should preferably be formed in consideration of the order in which the signal charges are read as an image.

The vertical transfer registers are, of course, driven in consideration of the pattern of the color filter segments. For example, in the case of a color filter of G stripe, RB full-checker pattern, the camera 10 reads out all the pixels in the low sensitivity mode or reads out the pixels by interlacing in the high sensitivity mode. The interlacing allows each field of image data to be read out with the signal charges of the same color mixed, and therefore obviates the mixture of image data between different colors, thereby insuring high image quality.

The signal charges thus read out are sequentially delivered to the output amplifier of the image sensor 38 implemented as a floating diffusion amplifier and transduced thereby to an analog voltage signal 42. The preprocessor 16 converts the analog voltage signal 42 to corresponding digital image data 48 and feeds the image data 48 to the signal processor 18.

The signal processor 18 executes gamma correction and other correction, matrix processing and compression on the input image data 48 to thereby produce luminance and color difference data (step S16). Further, in the signal processor 18, the image reducer generates R, G and B data for display from the luminance and color difference data subjected to matrix processing.

Subsequently, the compressed image data 56 are written into the recording medium of the storage 30 (step S18) while the reduced image data 58 are displayed on the monitor 28 (step S20). By the procedure described so far, the camera 10 completes photographing of a single picture.

The subroutine SUB will be described more specifically with reference to FIG. 3. As shown, the subroutine SUB begins with preliminary photometry (substep SS10). For preliminary photometry, the valid frame area of the image sensor 38 in which the entire area of the array of photosensitive cells is divided into a plurality of blocks. In this condition, the sums of R, G and B values in each block are read out.

Subsequently, white balance is adjusted and determined with each of the R, G and B data produced by preliminary photometry (substep SS12). This function is assigned to the estimated value calculator 50. The gains may be represented by the ratio of R:G:B.

After the substep SS12, the scene decider 60 determines whether or not color mixture is conspicuous in the image (substep SS14). It is known that color mixture tends to be conspicuous in a white or a gray zone of a picture field. For the decision, the scene decider 60 uses a subject value which is set in advance as the product of the R, G and B sums of each block and the white balance gains determined. In addition, the scene decider 60 uses a predetermined threshold, which is the product of the R, G and B sums in a certain image including a broad gray zone and the white balance gains. The scene decider 60 compares the subject value with the threshold in a condition wherein the R, G and B sums of each block are substantially equal to the reciprocal ratio 1/R:1/G:1/B of the white balance gains R:G:B.

If the subject value of the image to be measured is larger than the threshold (YES, substep SS14), the scene decider 60 determines that color mixture is conspicuous, so that the low drive frequency is set (substep S16). If the answer of the substep SS14 is NO, the scene decider 60 determines that color mixture is not conspicuous, so that the usual, i.e. high, drive frequency is set (substep SS18).

More specifically, when the low drive frequency should be selected, an indication such as a flag is set to, e.g. "0" for the subject image (substep SS16). When the usual drive frequency should be selected, the flag is set to, e.g. "1" (substep SS18). Such a flag is sent to the signal generator 72 in the form of control signal 66. Thereafter, the procedure returns to the step S12, FIG. 2.

While the illustrative embodiment is adapted to assign the usual drive frequency to the low sensitivity mode, it may be adapted to assign the usual drive frequency to the high sensitivity mode. In the latter case, the frequency for the low sensitivity mode may be about twice as high as the usual drive frequency.

As stated above, the drive frequency for horizontal transfer is switched in accordance with the sensitivity selected by the user, so that the influence of color mixture is noticeably reduced. It should be noted that the drive voltage may be switched in place of the drive frequency in order to reduce the influence of color mixture. It is therefore possible to solve the problem that tint differs from sensitivity to sensitivity set for a given subject to be shot.

Moreover, by comparing the R, G and B sums with the threshold, it is possible to make a decision more faithful to the possibility of color mixture involved in an actual image than by simply selecting the sensitivity.

In summary, in accordance with the present invention, a solid-state image pickup apparatus includes a selecting circuit for selecting a sensitivity and feeds a system controller with information representative of the sensitivity. In response, the system controller generates a control signal matching with the sensitivity and delivers the control signal to a timing generator. The timing generator generates a timing signal in response to the control signal. Therefore, even when a solid-state image sensor is driven by a horizontal transfer signal whose frequency is made lower than a usual frequency in accordance with the sensitivity selected, it is possible to enhance transfer efficiency for a single stage of transfer, and therefore to noticeably reduce the influence of color mixture although the reading time of signal charges is extended. This is because, despite such a way of drive, the amount of signal charges, i.e. the number of electrons resulting from the sensitivity decreases little. The image pickup apparatus can therefore prevent image quality from being lowered by the increased number of pixels or the enhanced sensitivity of the imaging system.

The entire disclosure of Japanese patent application No. 2003-091393 filed on Mar. 28, 2003, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A solid-state image pickup apparatus for converting light incident from an object field to an electric picked-up signal and processing the electric picked-up signal to produce an image signal, comprising:

a solid-state image sensor comprising an array of photosensitive cells bidimensionally arranged and converting the light to signal charges in accordance with an optical sensitivity of the photosensitive cells themselves corresponding to a sensitivity of the International Organization of Standardization (ISO), the optical sensitivity indicating a gain for generating signal charges in response to a predetermined amount of light incident on the photosensitive cells, vertical transfer paths for vertically transferring the signal charges read out from said array of photosensitive cells, and a horizontal transfer path extending perpendicularly to said vertical transfer paths and responsive to a horizontal transfer signal for transferring the signal charges received from the vertical transfer paths in a horizontal direction to thereby output the signal charges as the picked-up signal;

a selecting circuit for selecting one of a plurality of optical sensitivities which are different from each other;

a system controller for generating a control signal in accordance with the sensitivity selected; and a timing generator for generating a timing signal for transferring the signal charges for said solid-state image sensor in accordance with the control signal;

said timing generator lowering a first frequency of the horizontal transfer signal for use in transferring signal charges in the horizontal direction when the sensitivity selected is higher than a predetermined value, and increasing above the first frequency a second frequency of the horizontal transfer signal for use in transferring the signal charges in the horizontal direction when the sensitivity selected is lower than the predetermined value.

* * * * *